United States Patent
Busser

(10) Patent No.: US 9,302,690 B1
(45) Date of Patent: Apr. 5, 2016

(54) HAND CART SUPPLEMENTAL SHELF DEVICE

(71) Applicant: Monte Busser, Colton, SD (US)

(72) Inventor: Monte Busser, Colton, SD (US)

( * ) Notice: Subject to any disclaimer, the term of this patent is extended or adjusted under 35 U.S.C. 154(b) by 0 days.

(21) Appl. No.: 14/573,870

(22) Filed: Dec. 17, 2014

(51) Int. Cl.
*A47F 5/00* (2006.01)
*B62B 1/12* (2006.01)

(52) U.S. Cl.
CPC .............. *B62B 1/12* (2013.01); *B62B 2205/00* (2013.01); *B62B 2205/32* (2013.01)

(58) Field of Classification Search
CPC .. B62B 1/12; B62B 2205/00; B62B 2205/02; B62B 2202/022; B62B 2202/12; B62B 2202/28; B62B 1/14; B62B 1/00; B62B 1/26; B62B 2205/32; B25H 3/00
USPC ............................................. 211/134; 280/35
See application file for complete search history.

(56) References Cited

U.S. PATENT DOCUMENTS

| 3,052,323 | A | * | 9/1962 | Hopfeld | 187/232 |
|---|---|---|---|---|---|
| 4,889,057 | A | * | 12/1989 | Chartrand | 108/42 |
| D318,390 | S | * | 7/1991 | Murray | D6/513 |
| 5,123,666 | A | * | 6/1992 | Moore | 280/47.28 |
| 5,469,999 | A | | 11/1995 | Phirippidis | |
| 5,547,080 | A | * | 8/1996 | Klimas | 206/373 |
| 6,000,497 | A | * | 12/1999 | Kain et al. | 182/129 |
| 6,131,699 | A | * | 10/2000 | Leak, Jr. | 182/129 |
| 6,325,221 | B2 | * | 12/2001 | Parham | 211/59.2 |
| 6,772,889 | B2 | | 8/2004 | Moceri | |
| 6,966,574 | B1 | | 11/2005 | Dahl | |
| 7,007,614 | B2 | | 3/2006 | Gaunt et al. | |
| 7,490,847 | B2 | | 2/2009 | Dahl | |
| 7,798,336 | B2 | * | 9/2010 | Shiao | 211/70.6 |
| 8,016,139 | B2 | * | 9/2011 | Hanners et al. | 211/184 |
| 8,083,028 | B2 | * | 12/2011 | Johnson | 182/113 |
| 8,186,521 | B2 | * | 5/2012 | Yu | 211/106 |
| 8,226,092 | B2 | * | 7/2012 | Oliver | 280/47.18 |
| 8,251,379 | B2 | | 8/2012 | Watzke | |
| 8,696,014 | B2 | | 4/2014 | Lin | |
| 8,714,369 | B2 | | 5/2014 | Liu et al. | |
| 8,881,917 | B1 | * | 11/2014 | Sooknanan | 211/70.6 |
| 2003/0001348 | A1 | * | 1/2003 | Weida | 280/47.19 |
| 2007/0295681 | A1 | * | 12/2007 | Colin | 211/90.03 |

FOREIGN PATENT DOCUMENTS

JP 2001245732 9/2001

* cited by examiner

*Primary Examiner* — Korie H Chan

(57) ABSTRACT

A hand cart supplemental shelf device adds shelving to a hand cart. The device includes a base shelf and a beam coupled to the base shelf. A hook is coupled to and extends from the beam for engaging a cross brace of a hand cart when the beam abuts a pair of spaced uprights of the hand cart. Each of a pair of connectors is coupled to and extends from the beam such that each connector is configured for coupling the base shelf to an associated one of the uprights of the hand cart wherein the base shelf is secured to the hand cart.

10 Claims, 4 Drawing Sheets

HAND CART SUPPLEMENTAL SHELF DEVICE

BACKGROUND OF THE DISCLOSURE

Field of the Disclosure

The disclosure relates to shelf devices and more particularly pertains to a new shelf device for adding shelving to a hand cart.

SUMMARY OF THE DISCLOSURE

An embodiment of the disclosure meets the needs presented above by generally comprising a base shelf and a beam coupled to the base shelf. A hook is coupled to and extends from the beam for engaging a cross brace of a hand cart when the beam abuts a pair of spaced uprights of the hand cart. Each of a pair of connectors is coupled to and extends from the beam such that each connector is configured for coupling the base shelf to an associated one of the uprights of the hand cart wherein the base shelf is secured to the hand cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
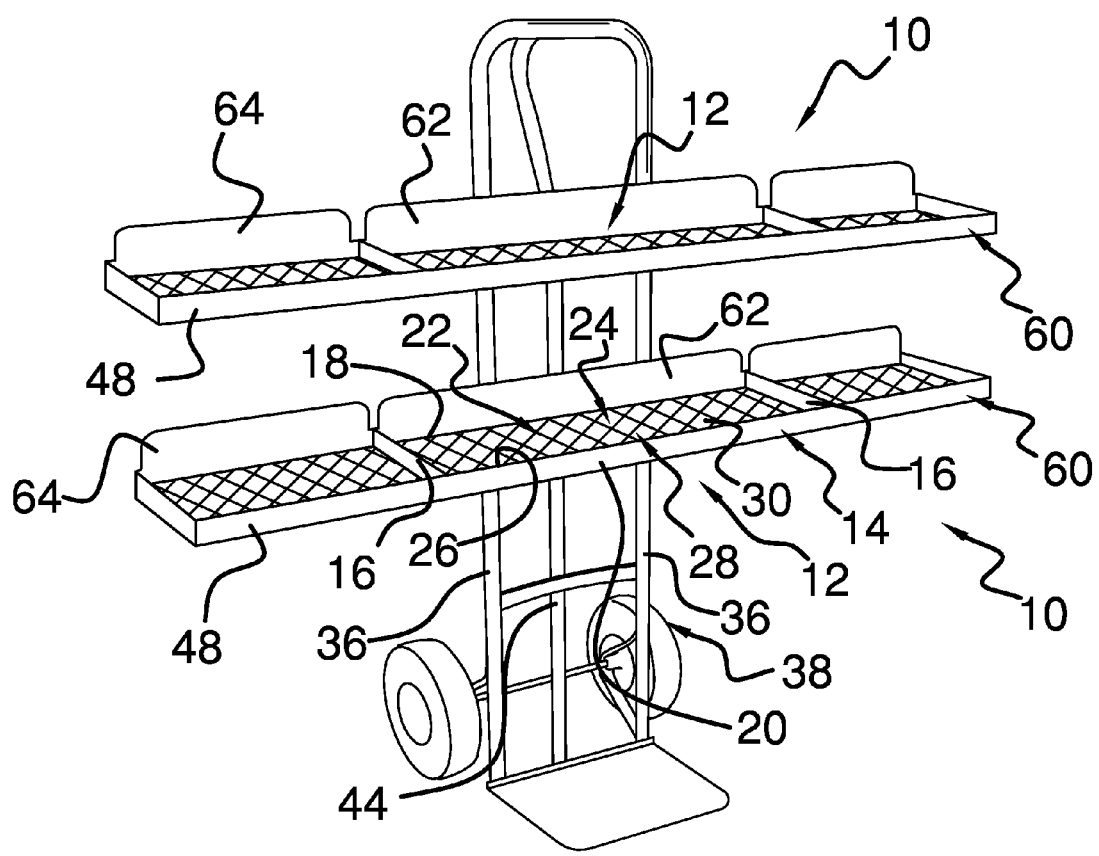
FIG. 1 is a top front side perspective view of a hand cart supplemental shelf device according to an embodiment of the disclosure.
Figure 2:
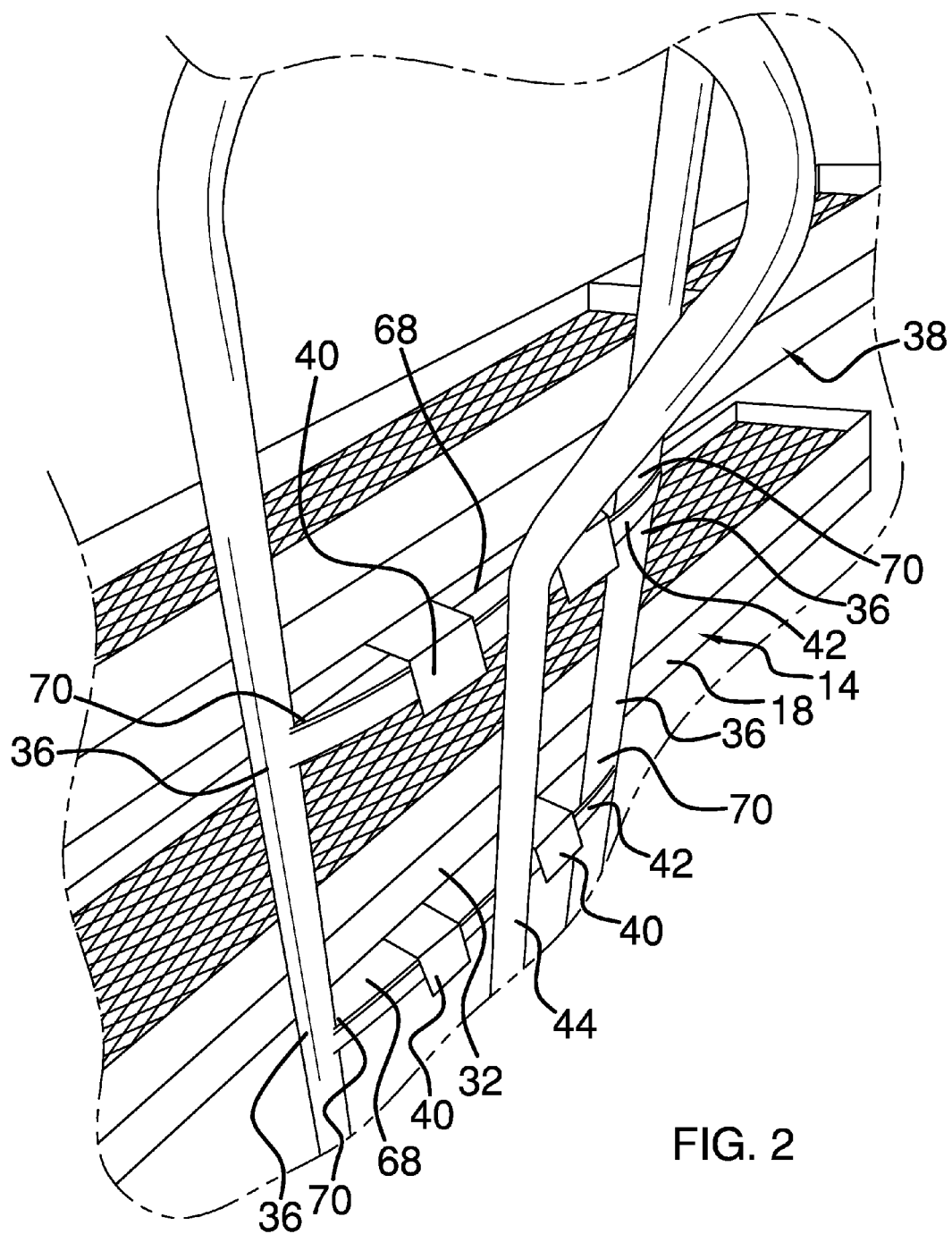
FIG. 2 is a partial top back side perspective view of an embodiment of the disclosure.
Figure 3:
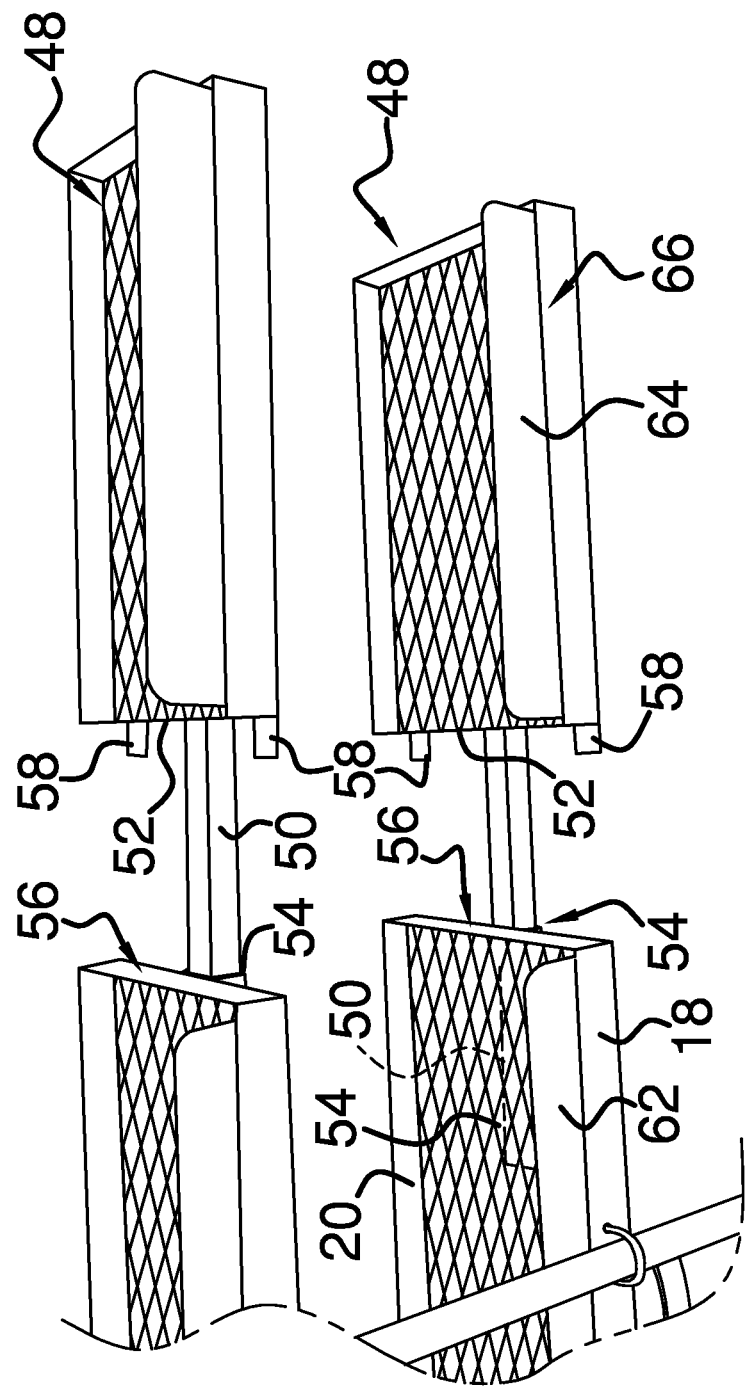
FIG. 3 is a partial back view of an embodiment of the disclosure.
Figure 4:
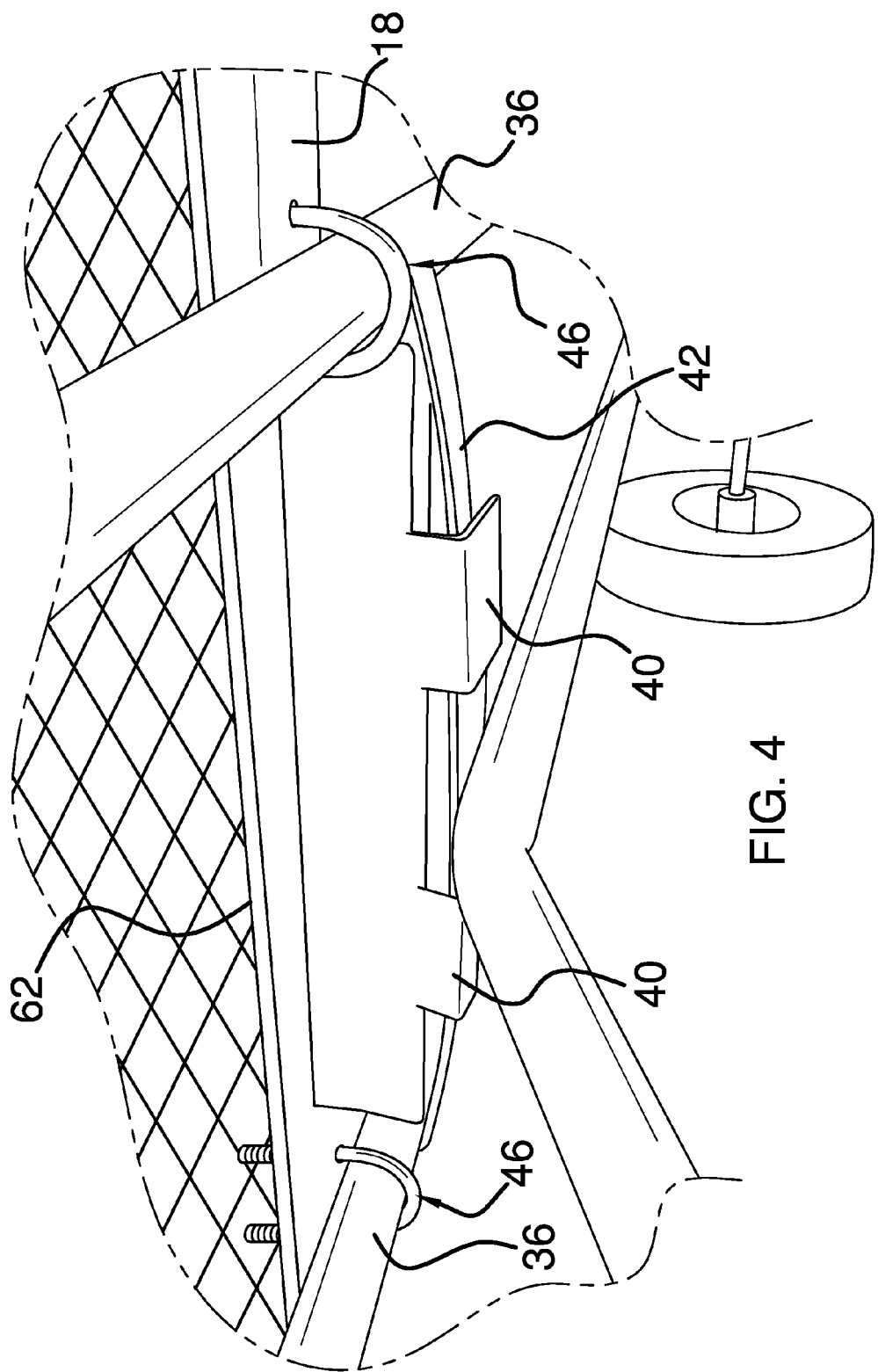
FIG. 4 is a partial top back side perspective view of an embodiment of the disclosure.

With reference now to the drawings, and in particular to FIGS. 1 through 4 thereof, a new shelf device embodying the principles and concepts of an embodiment of the disclosure and generally designated by the reference numeral 10 will be described.

As best illustrated in FIGS. 1 through 4, the hand cart supplemental shelf device 10 generally comprises a base shelf 12. The base shelf 12 comprises a base frame 14 having a pair of end edges 16, a first longitudinal edge 18, and a second longitudinal edge 20. The base shelf 12 further comprises a deck 22 coupled to the base frame 14. The deck 22 is coextensive with the base frame 14. The base frame 14 extends upwardly relative to an upper surface 24 of the deck 22 wherein the base frame 14 defines a lip 26 extending around the deck 22. A supporting surface 28 of the deck 22 defining the upper surface 24 is a perforated screen 30 or the like.

A beam 32 is coupled to the base shelf 12. The beam 32 is integrally incorporated into the base frame 14 defining the first longitudinal side 18 of the base frame 14. The first longitudinal side 18 of the base frame 14 has a block 68 having opposite ends 70. The opposite ends 70 define a width of the block 68 such that the block 68 is configured for insertion between the uprights 36 of the hand cart 38 wherein the opposite ends 70 of the block 68 abut the uprights 36 such that the block 68 inhibits lateral movement of the base shelf 12 relative to the hand cart 38. The block 68 may be integrally incorporated into the beam 32 or a separate piece fixable to the base frame 14 in a static manner.

Each of a pair of spaced hooks 40 is coupled to and extends from the beam 32 such that each of the hooks 40 extends rearwardly relative to the base shelf 12. Each of the hooks 40 is configured for engaging a cross brace 42 of the hand cart 38 to an associated side of a central brace 44 of the hand cart 38 when the first longitudinal side 18 of the base frame 14 and/or the beam 32 abuts the pair of spaced uprights 36 of the hand cart 38. Each of a pair of connectors 46 is coupled to and extends from the base frame 14 such that each connector 46 is configured for coupling the base shelf 12 to an associated one of the uprights 36 of the hand cart 38 wherein the base shelf 12 is secured to the hand cart 38. Each connector 46 is substantially U-shaped wherein each connector 46 is configured for extending around the associated upright 36 of the hand cart 38 such that the associated upright 36 is surrounded by the connector 46 and first longitudinal side 18 of the base frame 14.

An auxiliary shelf 48 may be provided for coupling to the base shelf 12. A rail 50 is coupled to and extends from the auxiliary shelf 48. The rail 50 extends outwardly from an end side 52 of the auxiliary shelf 48. The construction of the auxiliary shelf 48 may be similar to the base shelf 12 employing a respective frame, lip, and upper surface defined by perforated screen. A receiver 54 is coupled to and extends laterally into the base shelf 12 underneath the deck 22. The rail 50 is insertable into the receiver 54 wherein the auxiliary shelf 48 is coupled to the base shelf 12. The receiver 54 extends inwardly relative to an end side 56 of the base shelf 12 wherein the auxiliary shelf 48 is positioned laterally relative to the base shelf 12 when the rail 50 is inserted into the receiver 54. The rail 50 and receiver 54 may be constructed of nested polygonal tubing.

Each of a pair of spaced flanges 58 is coupled to and extends from the auxiliary shelf 48 outwardly and downwardly from the end side 52 of the auxiliary shelf 48 such that each flange 58 facilitates alignment of the auxiliary shelf 48 with the base shelf 12 when the auxiliary shelf 48 is moved into abutment with the base shelf 12. A second similarly structured auxiliary shelf 60 may be provided and attached to an opposite side of the base shelf 12.

A backing panel 62 is coupled to the base shelf 12. The backing panel 62 extends across the base shelf 12 aligned with the first longitudinal side 18 of the base frame 14. A planar back 64 is coupled to the auxiliary shelf 48. The back 64 extends along and is vertically aligned with a back edge 66 of the auxiliary shelf 48.

In use, the base shelf 12 is coupled to the hand cart 38 as described above. The auxiliary shelf 48 and second auxiliary shelf 60 are each attached to the base shelf 12 as described above if so desired. A plurality of similarly structured base shelves may be similarly attached to other cross braces of the hand cart 38. Each shelf added to the hand cart 38 may be sized and structured to provide desired dimensions and weight bearing capacity when attached to the hand cart 38. The base shelf 12 may be provided separately as an attachment to an existing hand cart 38 or specifically designed and provided as an accessory with the hand cart 38. The auxiliary shelves 48,60 may be removed and the base shelf 12 provided with a width allowing the base shelf 12 to pass through a standard sized doorway without being removed from the hand cart 38. The device 10 provides for uses in various locations for various purposes including but not limited to offshore drilling environments, farming, household uses, and other places where enhanced carrying capacity for a hand cart which may still be passed through standard sized or tight doorways.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand cart supplemental shelf device comprising:
    a base shelf, said base shelf comprising a base frame having a pair of end edges, a first longitudinal edge, and a second longitudinal edge, said base shelf further comprising a deck coupled to said base frame, said deck being coextensive with said base frame, said first longitudinal edge of said frame having a block having opposite ends, said opposite ends defining a width of said block such that said block is configured for insertion between the uprights of the hand cart wherein said opposite ends of said block abut the uprights such that said block inhibits lateral movement of said base shelf relative to the hand cart;
    a beam coupled to said base shelf;
    a hook coupled to and extending from said beam such that said hook extends rearwardly relative to said base shelf wherein said hook is configured for engaging a cross brace of a hand cart when said beam abuts a pair of spaced uprights of the hand cart;
    a pair of connectors, each said connector being coupled to and extending from said beam such that each said connector is configured for coupling said base shelf to an associated one of the uprights of the hand cart wherein said base shelf is secured to the hand cart, each said connector being substantially U-shaped wherein each said connector is configured for extending around the associated upright of the hand cart such that the associated upright is surrounded by said connector and said beam;
    an auxiliary shelf;
    a rail coupled to and extending from said auxiliary shelf; and
    a receiver coupled to and extending into said base shelf, said rail being insertable into said receiver wherein said auxiliary shelf is coupled to said base shelf.

2. The device of claim 1, further comprising said beam being integrally incorporated into said base frame defining said first longitudinal edge of said base frame.

3. The device of claim 1, further comprising said rail extending outwardly from an end side of said auxiliary shelf, said receiver extending inwardly relative to an end side of said base shelf wherein said auxiliary shelf is positioned laterally relative to said base shelf when said rail is inserted into said receiver.

4. The device of claim 1, further comprising said base frame extending upwardly relative to an upper surface of said deck wherein said base frame defines a lip extending around said deck.

5. The device of claim 1 further comprising a supporting surface of said deck being a perforated screen.

6. The device of claim 3, further comprising a flange coupled to and extending from said auxiliary shelf outwardly and downwardly from said end side of said auxiliary shelf such that said flange facilitates alignment of said auxiliary shelf with said base shelf when said auxiliary shelf is moved into abutment with said base shelf.

7. The device of claim 1, further comprising a backing panel coupled to said base shelf, said backing panel extending across said base shelf aligned with said first longitudinal edge of said base frame.

8. The device of claim 1, further comprising a planar back coupled to said auxiliary shelf, said back extending along and being vertically aligned with a back edge of said auxiliary shelf.

9. The device of claim 1, further comprising said hook being one of a pair of spaced hooks coupled to and extending from said beam such that each of said hooks extends rearwardly relative to said base shelf wherein each of said hooks is configured for engaging the cross brace of the hand cart to an associated side of a central brace of the hand cart when said beam abuts the pair of spaced uprights of the hand cart.

10. A hand cart supplemental shelf device comprising:
    a base shelf, said base shelf comprising a base frame having a pair of end edges, a first longitudinal edge, and a second longitudinal edge, said base shelf further comprising a deck coupled to said base frame, said deck being coextensive with said base frame, said base frame extending upwardly relative to an upper surface of said deck wherein said base frame defines a lip extending around said deck, a supporting surface of said deck being a perforated screen;
    a beam coupled to said base shelf, said beam being integrally incorporated into said base frame defining said first longitudinal edge of said base frame, said first longitudinal edge of said base frame having a block having opposite ends, said opposite ends defining a width of said block such that said block is configured for insertion between the uprights of the hand cart wherein said opposite ends of said block abut the uprights such that said block inhibits lateral movement of said base shelf relative to the hand cart;
    a pair of spaced hooks coupled to and extending from said beam such that each of said hooks extends rearwardly relative to said base shelf wherein each of said hooks is configured for engaging the cross brace of the hand cart to an associated side of a central brace of the hand cart when said beam abuts the pair of spaced uprights of the hand cart;

a pair of connectors, each said connector being coupled to and extending from said beam such that each said connector is configured for coupling said base shelf to an associated one of the uprights of the hand cart wherein said base shelf is secured to the hand cart, each said connector being substantially U-shaped wherein each said connector is configured for extending around the associated upright of the hand cart such that the associated upright is surrounded by said connector and said beam;

an auxiliary shelf;

a rail coupled to and extending from said auxiliary shelf, said rail extending outwardly from an end side of said auxiliary shelf;

a receiver coupled to and extending into said base shelf, said rail being insertable into said receiver wherein said auxiliary shelf is coupled to said base shelf, said receiver extending inwardly relative to an end side of said base shelf wherein said auxiliary shelf is positioned laterally relative to said base shelf when said rail is inserted into said receiver;

a pair of spaced flanges coupled to and extending from said auxiliary shelf outwardly and downwardly from said end side of said auxiliary shelf such that each said flange facilitates alignment of said auxiliary shelf with said base shelf when said auxiliary shelf is moved into abutment with said base shelf;

a backing panel coupled to said base shelf, said backing panel extending across said base shelf aligned with said first longitudinal edge of said base frame; and a planar back coupled to said auxiliary shelf, said back extending along and being vertically aligned with a back edge of said auxiliary shelf.

* * * * *